(12) United States Patent
Dasgupta et al.

(10) Patent No.: US 11,714,672 B2
(45) Date of Patent: *Aug. 1, 2023

(54) VIRTUAL INFRASTRUCTURE MANAGER ENHANCEMENTS FOR REMOTE EDGE CLOUD DEPLOYMENTS

(71) Applicant: Cisco Technology, Inc., San Jose, CA (US)

(72) Inventors: Santanu Dasgupta, Fremont, CA (US); Chandragupta Ganguly, San Jose, CA (US); Ian Wells, San Jose, CA (US); Rajiv Asati, Morrisville, NC (US); Om Prakash Suthar, Bolingbrook, IL (US); Vinod Pandarinathan, Fremont, CA (US); Ajay Kalambur, Fremont, CA (US); Yichen Wang, San Jose, CA (US); John Wei-I Wu, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,381

(22) Filed: Nov. 8, 2021

(65) Prior Publication Data

US 2022/0222102 A1 Jul. 14, 2022

Related U.S. Application Data

(63) Continuation of application No. 16/408,634, filed on May 10, 2019, now Pat. No. 11,210,126.
(Continued)

(51) Int. Cl.
*G06F 9/455* (2018.01)
*H04W 76/10* (2018.01)
(Continued)

(52) U.S. Cl.
CPC .......... *G06F 9/45558* (2013.01); *H04L 41/04* (2013.01); *H04L 41/046* (2013.01);
(Continued)

(58) Field of Classification Search
None
See application file for complete search history.

(56) References Cited

U.S. PATENT DOCUMENTS 9,979,602 B1 5/2018 Chinnakannan et al.
10,033,595 B2 7/2018 Sif et al.
(Continued)

OTHER PUBLICATIONS

Wikipedia, "Edge Computing Group", https://wiki.openstack.org/wiki/Edge_Computing_Group, downloaded May 9, 2019, 8 pages.
(Continued)

*Primary Examiner* — Qing Yuan Wu
(74) *Attorney, Agent, or Firm* — Edell, Shapiro & Finnan, LLC

(57) ABSTRACT

A system is provided that includes one management cluster to manage network function virtualization infrastructure (NFVI) resources lifecycle in more than one edge POD locations, where resources include hardware and/or software, and where software resources lifecycle includes software development, upgrades, downgrades, logging, monitoring etc. Methods are provided for decoupling storage from compute and network functions in each virtual machine (VM)-based NFVI deployment location and moving it to a centralized location. Centralized storage could simultaneously interact with more than one edge PODs, and the security is built-in with periodic key rotation. Methods are provided for increasing NFVI system viability by dedicating (fencing) CPU core pairs for specific controller operations and workload operations, and sharing the CPU cores for specific tasks.

20 Claims, 6 Drawing Sheets

Related U.S. Application Data

(60) Provisional application No. 62/806,041, filed on Feb. 15, 2019.

(51) Int. Cl.

| | | |
|---|---|---|
| *H04L 41/046* | (2022.01) | |
| *H04L 41/04* | (2022.01) | |
| *H04W 28/00* | (2009.01) | |
| *H04L 41/40* | (2022.01) | |
| *H04L 67/10* | (2022.01) | |

(52) U.S. Cl.
CPC ............ *H04L 41/40* (2022.05); *H04W 28/00* (2013.01); *H04W 76/10* (2018.02); *G06F 2009/4557* (2013.01); *G06F 2009/45591* (2013.01); *G06F 2009/45595* (2013.01); *H04L 67/10* (2013.01)

(56) References Cited

U.S. PATENT DOCUMENTS

| | | |
|---|---|---|
| 2017/0104609 A1 | 4/2017 | McNamee et al. |
| 2018/0114012 A1 | 4/2018 | Sood et al. |
| 2019/0044886 A1 | 2/2019 | Bernat et al. |
| 2021/0051077 A1 | 2/2021 | Dempo |

OTHER PUBLICATIONS

EdgePod, "MLS Unveils EdgePod™ Data Centers in Advance of 5G Launching", Jan. 21, 2019, https://edge-pod.com/mls-unveils-edgepod-data-centers-in-advance-of-5g-launching/, 5 pages.

NetWorld2020, "Smart Networks in the context of NGI", Strategic Research and Innovation Agenda 2021-27, 5G Infrastructure Association, Apr. 2018, 114 pages.

OpenStack Team, "Red Hat OpenStack Platform 14-Beta", Director Installation and Usage, Dec. 12, 2018, 191 pages.

K. R. Jayaram et al., "Trustworthy Geographically Fenced Hybrid Clouds", Middleware'14, Dec. 8-12, 2014, 12 pages.

EdgePod, "Turning Towers Into MicroData Centers One Pod at a Time", Jun. 25, 2018, https://edge-pod.com/turning-towers-into-microdata-centers-one-pod-at-a-time/, 3 pages.

Arunkumar Kodagi Ramachandra et al., VMware, Inc., "vCloud NFV OpenStack Edition Reference Architecture", VMware vCloud NFV OpenStack Edition 3.0, https://docs.vmware.com/en/VMware-vCloud-NFV-OpenStack-Edition/3.0/vmware-vcloud-nfv-openstack-edition-ra30/GUID-F01E04AE-3AFA-4653-87BE-2EA45C421B60.html, Dec. 13, 2018, 106 pages.

Vassilaras, et al., "The Algorithmic Aspects of Network Slicing," Network Slicing in 5G Systems, IEEE Communications Magazine, Aug. 2017, 8 pages.

VIRTUAL INFRASTRUCTURE MANAGER ENHANCEMENTS FOR REMOTE EDGE CLOUD DEPLOYMENTS

PRIORITY CLAIM

This application is a continuation of U.S. application Ser. No. 16/408,634, filed May 10, 2019, and issued on Dec. 28, 2021, as U.S. Pat. No. 11,210,126, which claims priority to U.S. Provisional Application No. 62/806,041, filed Feb. 15, 2019, entitled "Virtual Infrastructure Manager Enhancements for Remote Edge Cloud Deployments," the entirety of which applications are incorporated herein by reference.

TECHNICAL FIELD

The present disclosure relates to computing environments for mobile core networks.

BACKGROUND

Many mobile network operators are intending to distribute telecommunication cloud networks having thousands of remote locations for deployment of applications such as Multi-Access Edge Computing (MEC), Virtualized Radio Access Network (vRAN), Content Delivery Networks (CDNs), etc., closer to the subscribers/user equipment. These remote locations may be very small and can house nano-sized datacenters.

DESCRIPTION OF EXAMPLE EMBODIMENTS

Overview

Figure 1:
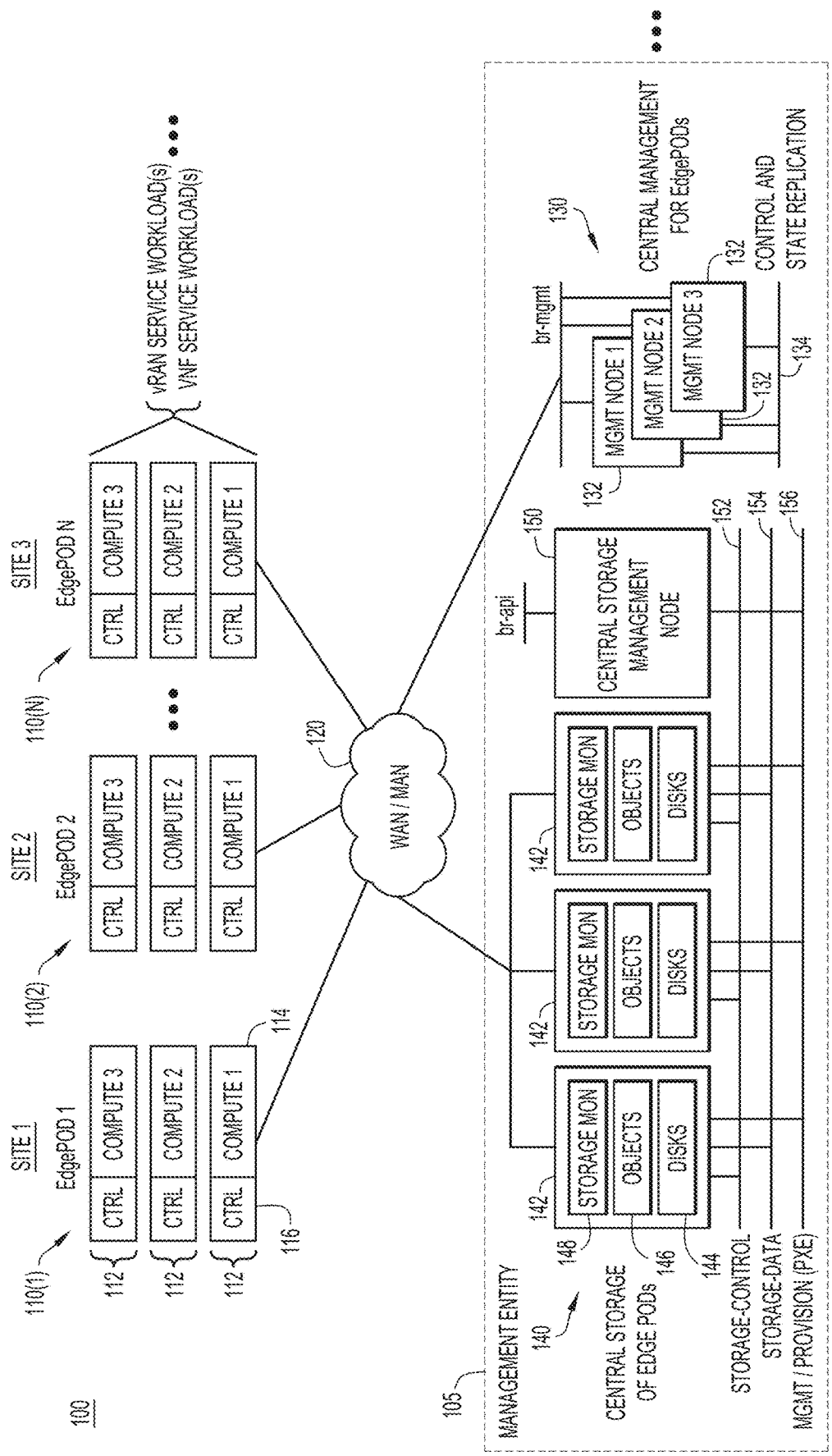
FIG. 1 is a block diagram of a system that includes a plurality of edge compute entities and a management entity configured for telecommunication cloud networks, according to an example embodiment.

Briefly, a system is provided that includes a management entity (cluster) and a plurality of remote compute entities. The management entity manages network function virtualization infrastructure (NFVI) resources' lifecycle in the plurality of remote compute entities, where resources include hardware and/or software, and where software resources' lifecycle includes software development, upgrades, downgrades, logging, monitoring, etc.

In addition, methods are provided for decoupling storage from compute and network functions in each virtual machine (VM)-based NFVI deployment location and re-locating it to a centralized location by maintaining management and monitoring capabilities intact. Centralized storage could simultaneously interact with more than one remote PODs, and where the security is built-in with periodic key rotation, and some of the storage functions, such as a VM software image hosting, could be provided by a router file system in the IP network.

Further still, methods are provided for increasing NFVI system viability by dedicating (fencing) central processing unit (CPU) core pairs for specific controller operations and workload operations, and sharing the CPU cores for specific tasks.

In one form, a system is provided that includes a plurality of edge compute entities and a management entity. The plurality of edge compute entities are configured to process low-latency workloads, each edge compute entity including multiple compute nodes that run virtual machines to perform radio access network compute and control functions, but not data storage functions, each edge compute entity further configured to execute a virtualization monitoring agent function. The management entity is in network communication with the plurality of edge compute nodes, and includes data storage resources to provide data storage for the plurality of edge compute entities and compute resources for management of the plurality of edge compute entities. The management entity is configured to execute a virtualization monitoring service function that is in communication with the virtualization monitoring agent function running on each of the plurality of edge compute entities to manage network function virtualization infrastructure (NFVI) lifecycle of resources of the plurality of edge compute entities.

Example Embodiments

To deploy a telecommunication cloud mobile core network, mobile network operators may use open source software, such as OpenStack®, for cloud/network function virtualization infrastructure (NFVI) along with an optimized OpenStack message bus queue to manage remote centralized storage. A Virtual Infrastructure Manager (VIM) may employ OpenStack for optimal design and deployment. In order to support distributed telecommunication (telco) cloud deployments, both scaling up and scaling down the size of the VIM may be employed using another entity called Network Function Virtualized Orchestrator (NFVO).

Edge OpenStack functions are typically deployed on server nodes, either in the same rack or in adjacent racks within the same data center location with compute and control nodes, and co-located storage. According to the embodiments presented herein, management and storage functions are remotely located in a centralized manner due to architecture constraints such as rack space, power and other design requirements such as latency, packet losses and edge service workloads. Moreover, such deployments may involve, for example, seven or more nodes (three nodes for control, three nodes for storage and at least one node for management) for cloud management purposes.

Such a deployment approach is suitable for distributed telco cloud deployments that include a datacenter edge and Multi-Access Edge Compute (MEC) nodes (remote compute entities) for processing low-latency workloads such as virtual radio access network (vRAN), real-time gaming, fast caching etc. A distributed telco cloud may have a limited number of compute nodes (less than 10 in some cases) in edge locations due to severe power and space (and cost) constraints. Moreover, the number of service workloads at each edge location could be very small (less than 10 in some cases). Accordingly, a goal in a distributed telco cloud is to reduce the physical cloud footprint (and minimize the space and power consumption) per edge location for cost and edge workload efficiency.

A challenge with such a deployment approach is that a large percentage (e.g., 70%) of the server nodes would be dedicated for cloud management, and not for hosting telco cloud workloads. It is desirable to not minimize the number of compute nodes needed in these remote locations, but also to maximize the use of the compute nodes for hosting telco cloud service workloads.

The goal to reduce physical cloud footprint, and yet provide service telco cloud related workloads' functionality, availability, performance, and security brings challenges that can prohibit NFVI viability. These challenges are presented below.

Edge Optimized Compute Servers and Storage Disks. Edge locations are typically telco datacenters that are traditionally designed to host transport equipment. There are physical constraints of such remote locations (unlike large datacenters) that do not allow server nodes that are deeper than 55-58 cm, and have limited access to power supplies and other environmental limitations, etc. This limits the space for network input/output (e.g., network interface cards/controllers (NICs)), storage disks, random access memory (RAM), etc. Since the network input/output (MC) density cannot be compromised for bandwidth-centric workloads, it is the storage that ends up suffering with few storage disks. This can greatly compromise VIM/OpenStack functionality. Also, since storage disks often fail, requiring repair in unmanned remote locations, this risks increasing operational expense (OPEX) and mean time to repair (MTTR).

Possible Impact on Network Throughput and Security. Private Internet Protocol version 4 (IPv4) addressing usage among OpenStack services may involve extensive usage of network address translation (NAT) due to possible overlapping IP space, in the event a few services such as Ceph (an open source object-based storage system), etc., are decoupled and moved into other locations separated by wide area network/metropolitan area network (WAN/MAN). Also, bandwidth for transfer of large amount of data between edge nodes and a central datacenter can impact network throughput (due to NAT), and can weaken the security aspects of those services, such as Ceph etc.

Poor NFV Performance. There are a number of issues that impact the NFV system performance with non-deterministic behavior, particularly for workloads that are sensitive to latency. For example, central processing unit (CPU) cores may be shared between service workloads (virtual network functions (VNFs)) and Linux Kernel-based Virtual Machine (KVM) and OpenStack, thereby impacting either the workload performance or VIM performance, or both. In addition, service workloads (VNFs) would dedicate one virtual CPU (vCPU) for housekeeping purposes (without any scheduling latencies constraints). Losing one vCPU worth of overhead per VNF will lower the VNF density per node.

Challenging Software Lifecycle Management. Operations such as software upgrades, downgrades etc., if done manually, would involve onsite presence in thousands of remote locations that are likely to be unmanned.

Accordingly, a solution is presented herein that provides several VIM enhancements to address the above issues and make NFVI viable for deployment in remote locations. This solution can facilitate distributed Multi-Access Edge Computing (MEC) by enabling edge functions (VNFs/Cloud-native Network Functions (CNFs)) closer to the subscriber/user equipment devices.

The system presented herein enhances VIM to address the above issues due to constraints such as limited power, rack space, storage, etc. in remote locations, and enables hosting vRAN workloads 0-hop or 1-hop away from base station/cell towers, where a hop is defined as direct physical connectivity between two entities. The idea is to re-use (maximize use of) the compute nodes at the remote compute entities for hosting the telco cloud service workloads such as vRAN functions etc., and avoid the use of dedicated compute nodes needed for VIM/OpenStack management.

Reference is first made to FIG. 1. FIG. 1 shows a block diagram of a system 100 that includes VIM enhancements of a telco cloud deployment. The system 100 includes a management entity 105 and a plurality of remote compute entities 110(1)-110(N) (also called edge clouds, edge PODs or edge compute entities) that deploy NFVI functions in remote locations. As indicated in FIG. 1, these remote compute entities perform vRAN service workloads and VNF service workloads.

As shown in FIG. 1, each remote compute entity 110(1)-110(N) has as few as three compute nodes 112 that share compute and control functions shown at 114 and 116. These compute nodes 112 are configured to run both a VIM/OpenStack controller and compute functions. More specifically, the compute nodes 112 run the host operating system Linux/KVM along with VIM/OpenStack controllers, as well as the telco cloud workloads such as vRAN service workloads and VNF service workloads. The OpenStack controllers on these 3 nodes are specified in an active-active-active cluster configuration (with load sharing) in order to provide cloud-like redundancy. Any additional nodes may be used as a pure compute node to scale the cloud on an as-needed basis. The management entity 105 can communicate with the plurality of remote compute entities 110(1)-110(N) over wide area network/metropolitan area network (WAN/MAN) 120.

Management Entity

The management entity 105 includes a management cluster 130 to manage NFVI resources' lifecycle at remote compute entities 110(1)-110(N) and a central storage cluster 140 that performs the remote centralized storage of data for the plurality of remote compute nodes. The management cluster 130 includes a plurality of management nodes 132 that perform control and state replication management over a control and state replication bus 134. That is, the management nodes 132 are compute nodes that are dedicated to provide automated VIM lifecycle management service for the remote compute entities.

The central storage cluster 140 includes a plurality of storage nodes 142 that include a plurality of storage disks 144 that store data objects 146. In addition, each storage node 142 runs a storage monitor function 148. The central storage cluster 140 further includes a central storage management node 150 that performs a variety of storage management functions. FIG. 1 also shows two logical or physical networks used for enabling simultaneous interaction of multiple remote compute entities. These logical or physical networks include a Storage-Control network 152 and a Storage-Data network 154. There is also a management/provision pre-boot execution environment (PXE) network/bus 156.

There are several options that may be taken in terms of the centrality of the management entity 105. In one embodiment, the management entity 105 may take the form of a single location of one or more servers. In another embodiment, the management entity 105 may include a physically distributed set of servers and storage disks co-operatively providing the management service (allowing multi-site failover and load distribution), and in still another form, the management entity 105 may include a number of independent or separate entities/services by region to manage a corresponding plurality of edge compute entities (keeping the failure domain smaller and distributing load). Thus, a "central" management entity for a specific range of edge locations can be expanded to a region, effectively resulting in multiple replications of the system 100 shown in FIG. 1.

Figure 2:
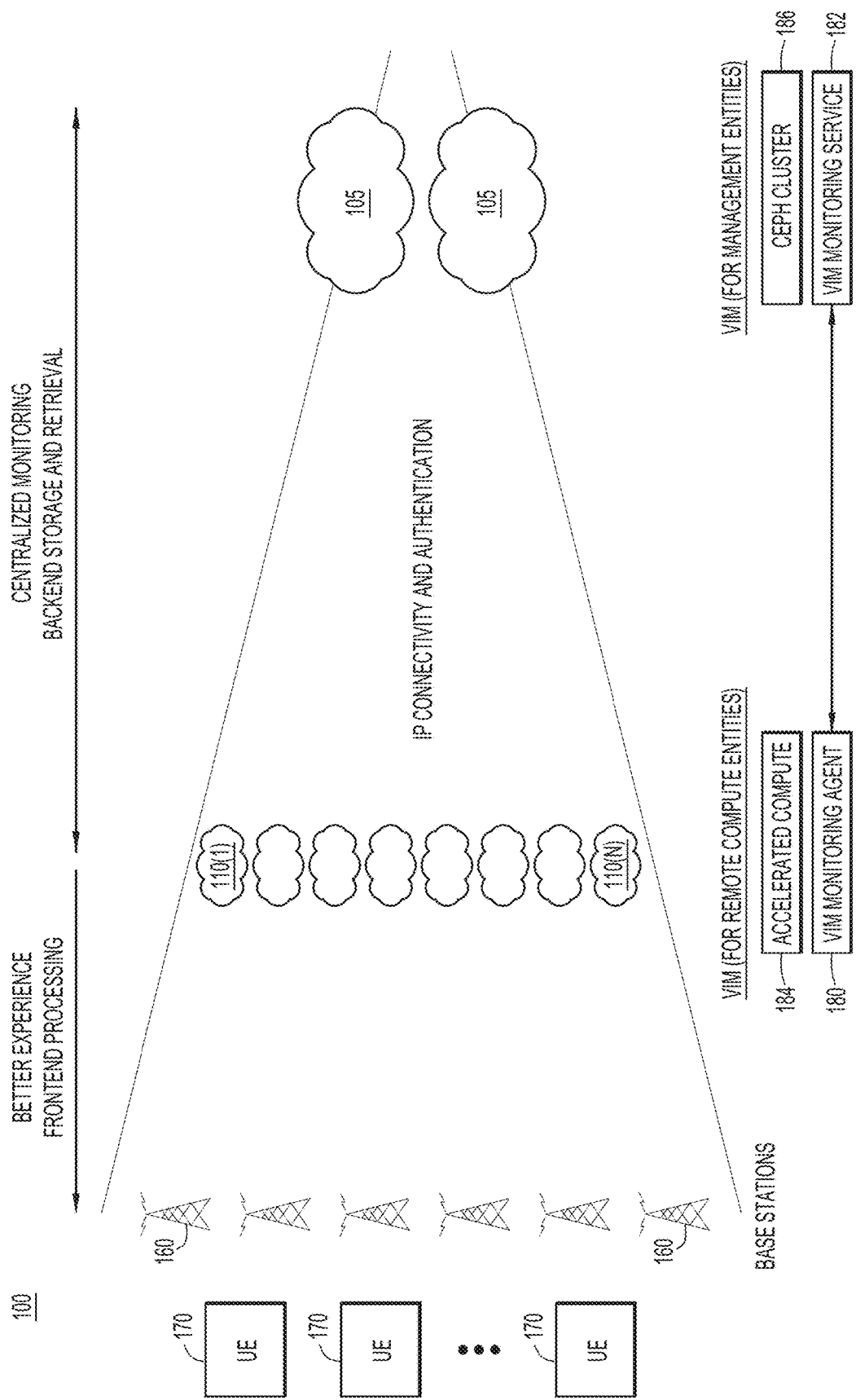
FIG. 2 illustrates a high-level operational flow of the system shown in FIG. 1, according to an example embodiment.

Reference is now made to FIG. 2. FIG. 2 shows the distribution of functions of the system 100, where the remote compute entities 110(1)-110(N) are connected to one or more base stations 160, one or more of which serve wireless communication with User Equipment's (UEs) 170. As shown in FIG. 2, the remote compute entities 110(1)-110(N) provide frontend processing for the base stations 160 and have IP connectivity and authentication back to the management entity 105. The management entity 105 provides centralized monitoring of the operations of the remote compute entities 110(1)-110(N) and backend storage and retrieval functions for the remote compute entities 110(1)-110(N). The base stations 160 may be configured to serve wireless communication according to multiple wireless technologies, such as the Long Term Evolution (LTE)/Fourth Generation (4G) technology, Fifth Generation (5G) technology, and any wireless communication technology now known or hereinafter developed. That is, some base stations 160 may be configured to serve LTE/4G communication, other base stations 160 may be configured to serve 5G communication, etc.

In addition, the VIM function for the remote compute entities 110(1)-110(N) are supported by a VIM monitoring agent 180 running on each remote compute entities 110(1)-110(N). Likewise, the VIM functions running on the management entity 105 include a VIM monitoring service 182 that interacts with the VIM monitoring agent 180. In addition, as shown in FIG. 2, there may be one more accelerated compute nodes 184 running on the remote compute entities 110(1)-110(N) and Ceph cluster 186.

Figure 3:
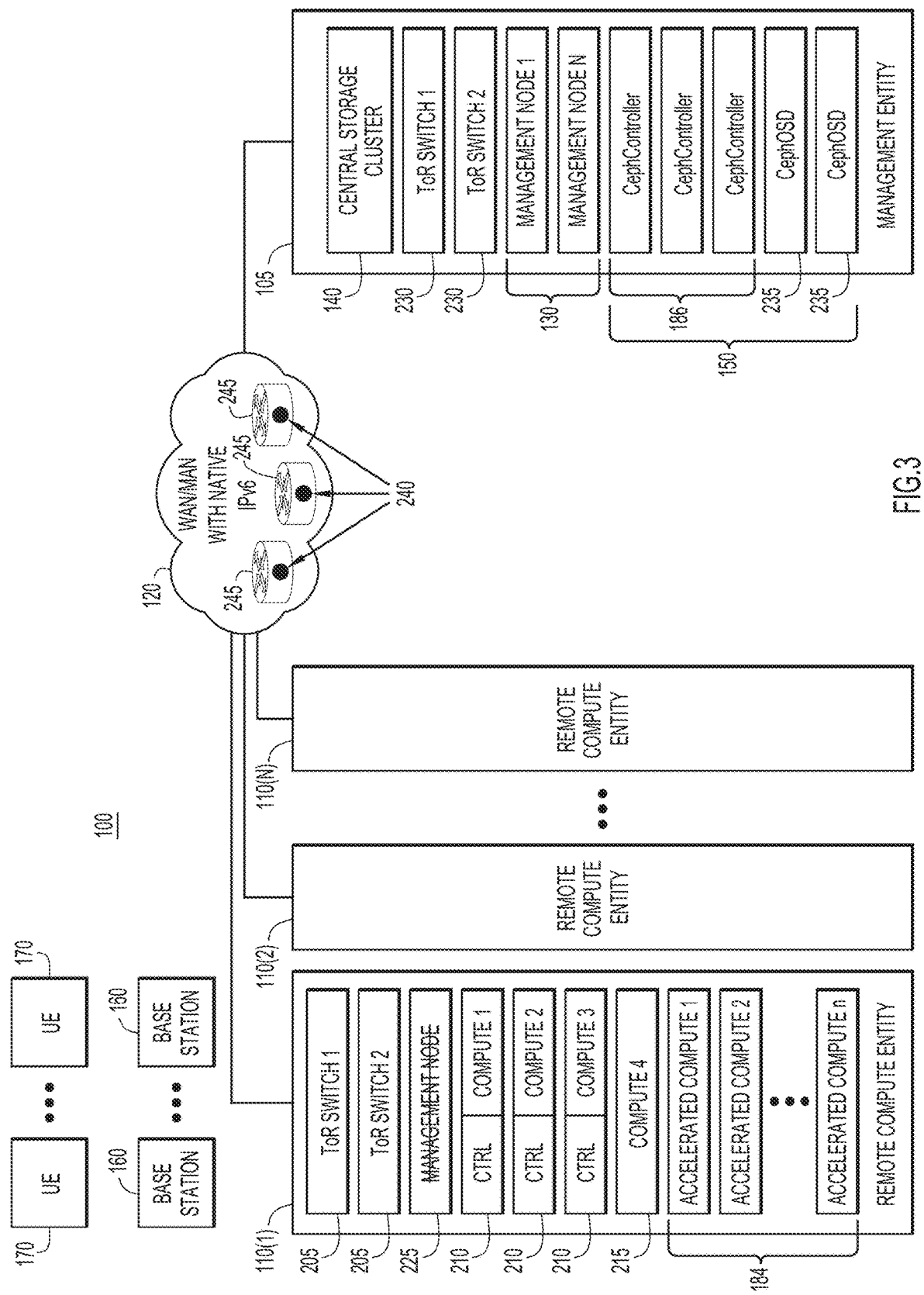
FIG. 3 illustrates a more detailed block diagram of the system of FIG. 1 and depicting the distributed nature of the compute, storage and management functions of the system, according to an example embodiment.

Reference is now made to FIG. 3. FIG. 3 shows the details of each remote compute entity 110(1)-110(N) in more detail. Each remote compute entity may include one or more Top-of-Rack (ToR) switches 205, several compute nodes 210 that share compute and control functions (as also depicted at 112 in FIG. 1), and optionally one or more additional compute nodes 215 as well as optionally a collection one or more accelerated compute nodes 184. Moreover, as shown at 225 in FIG. 2, there is no dedicated management node onsite at each remote compute entity 110(1)-110(N).

The management entity 105 includes the management cluster 130 of management nodes, one or more (e.g., two) ToR switches 230, the central storage cluster 140 and the central storage management node 150 that includes Ceph-Control cluster (Ceph cluster) 186 and optional Ceph object storage daemons (OSDs) (CephOSD nodes) 235. CephOSDs 235 are responsible for storing objects on a local file system and providing access to them over a network. The VIM deployment, monitoring, operations (e.g. node addition, replacement), version control, software update, etc., at each remote compute entity is performed by the management cluster 130.

The installation as well as monitoring of a remote compute entity is completely automated via a single intent file. The single intent file defines the server node names and roles, networking details, etc. During installation, a Ceph cluster identifier (ID) and glance image keys are fed into the intent file, so that post installation, the remote compute entity can communicate with a "Ceph monitor"/CephController of the central Ceph cluster 186 for glance image services. The glance image service provides a service by which data assets can be uploaded and discovered that are meant to be used with other services. Glance image services include discovering, registering, and retrieving VM images. The glance image service may involve the use of an API that allows querying of VM image metadata as well as retrieval of the actual image.

The architecture depicted in FIGS. 1-3 eliminates the need for having a local node dedicated for management of the NFVI in each remote location, as is usually required in NFV deployments. This enables architectural, operational and cost efficiencies.

Storage: Decoupled, Optimized and Secured

Reference is still made to FIG. 3. The storage (e.g. persistent storage, object storage and similar, unaffected by latency variations) is decoupled from the rest of the OpenStack services running in each remote compute entity. The storage architecture is designed such that the VIM/OpenStack services in each remote compute entity can reach out to the central storage cluster 140 for numerous storage related purposes. This enhancement specifically leverages Ceph in VIM. The Ceph service for glance image services (including bulk transfer such as software image download) is moved from the edge location to a central datacenter location. Image-based (and object-based) storage is used because it is infrequently fetched and can be cached at the expense of latency (and would be costly if done at the edge).

As shown at 186 in FIG. 3, a central Ceph cluster consists of 3 nodes at the management entity 105 in an active-active-active mode to provide the role of "CephController" (i.e., Ceph monitor). The CephController also plays a role in the OSD service, and thus has additional storage to store the glance images. If additional storage space is needed (beyond what provided by the CephContoller), this cluster can be expanded to have additional CephOSD nodes 235.

The central Ceph cluster 186 is further optimized so that it can serve glance images to multiple edge PODs. In another embodiment, as shown in FIG. 3, the glance images 240 may be stored on the storage disks (forming router file system) available on network elements 245, such as routers, in the WAN/MAN 120 and be served using an IP anycast mechanism.

To limit the bottleneck of multiple edge PODs simultaneously interacting with a single central Ceph cluster 186, the control and data plane within the central Ceph cluster 186 are run on two dedicated networks, logical or physical. A management network is used for control plane (Ceph monitoring, and API to fetch/upload images), and a cluster network is used for data plane triplication and storage. This is illustrated by the Storage-Control and Storage-Data networks 152 and 154, respectively, shown in FIG. 1.

In accordance with one embodiment, a security mechanism is provided to authenticate and encrypt (if necessary) communications between the central Ceph cluster 186 at the management entity 105 and the remote compute entities 110(1)-110(N), to trust each of the remote compute entities 110(1)-110(N) and allow them to fetch images from the central Ceph cluster 186. To do so, during the central Ceph cluster installation, the necessary Ceph cluster identifier (ID) and glance keys are listed in the single intent file for the remote compute entity, and then used during the installation of the remote compute entity. This ensures that once the remote compute entity comes up, image services can be securely obtained from the central Ceph cluster 186. This includes the use of Representational State Transfer (REST) APIs over Transport Layer Security (TLS) to communicate between remote compute entity and central Ceph cluster 186.

Furthermore, a mechanism may be provided to rotate the keys in the central Ceph cluster 186, followed by reconfiguring the remote compute entity with the new keys to ensure the keys change periodically for added security.

Deterministic CPU Core Fencing

In accordance with one embodiment, 'CPU Core Fencing' is provided to ensure that the VIM or VNF related task(s) run only on the specified CPU core(s), and the specified CPU core(s) are allowed to only run the chosen task(s), whether shared or not, so as to dramatically improve the overall NFV system performance in a deterministic manner. The fencing is done in two different contexts.

Fencing for VIM Control Plane Improvements

Figure 4:
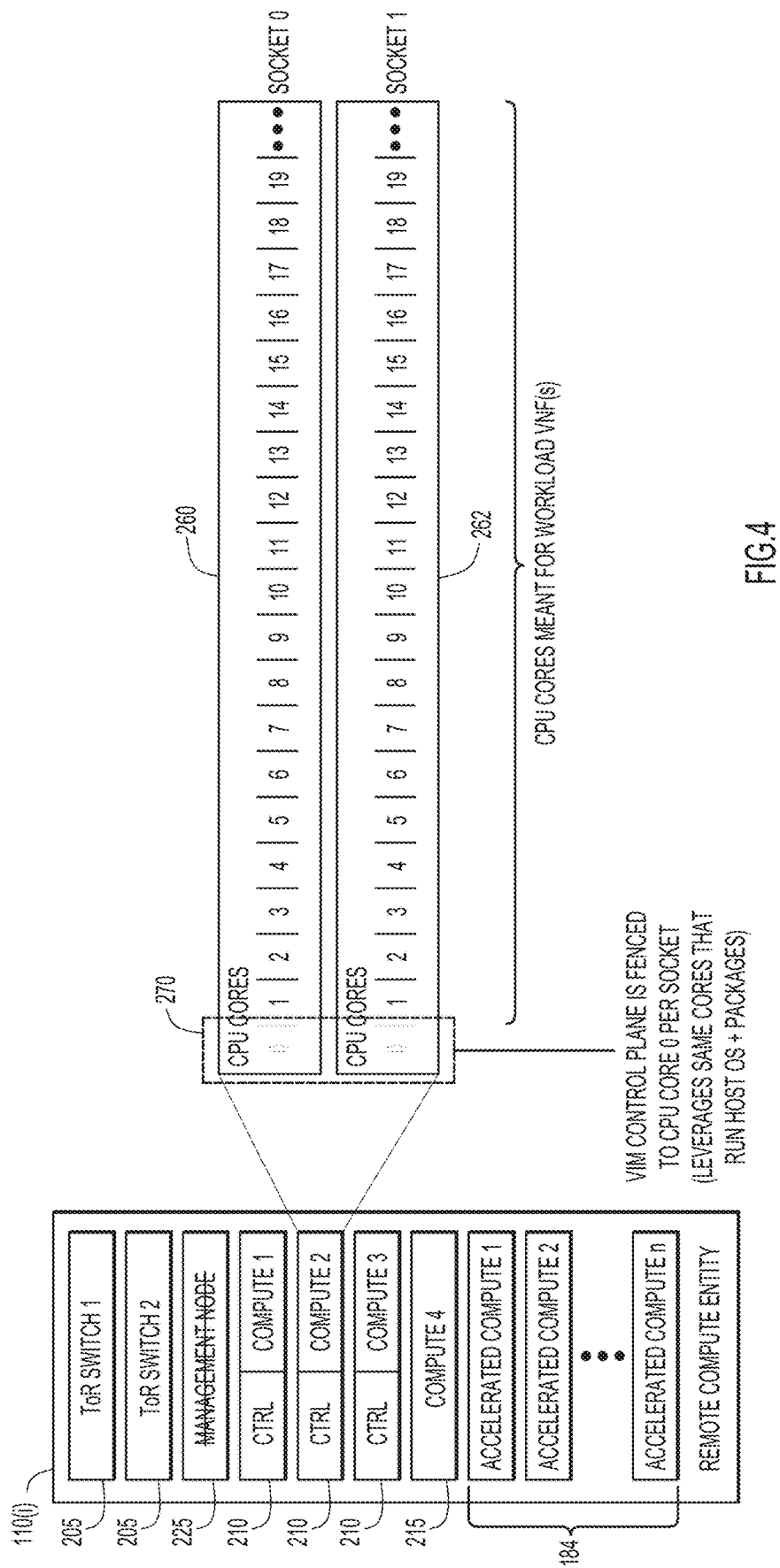
FIGS. 4 and 5 illustrate use of central processing unit fencing in order to preserve compute resources at the edge compute entities for servicing workloads, according to an example embodiment.

Reference is made to FIG. 4. FIG. 4 shows allocation of CPU cores for a given one of the shared compute nodes 210 of a given remote compute entity 110(*i*). In one example, there are multiple CPU sockets for each compute node 210, e.g., Socket 0 and Socket 1 shown at reference numerals 260 and 262, respectively. Each socket has multiple CPU cores. In accordance with one embodiment, as shown at 270, a specific CPU core(s) (such as, Core 0) per CPU socket, is fenced by isolating (e.g. using an Isolcpus boot parameter that isolates CPUs from the kernel scheduler), so that the specific CPU core(s) is/are not used by any user-space processes (e.g. guest VMs), and then by dedicating (e.g., by using CPUAffinity (a feature of Linux to bind one or more processes to one or more processors) and/or CPUPinning parameters (a Linux feature that enables the binding and unbinding of a process or a thread to a central processing unit (CPU) or a range of CPUs, so that the process or thread will execute only on the designated CPU or CPUs rather than any CPU) the same CPU core(s) per CPU socket to handle processing associated with the VIM control plane along with Linux/KVM OS, etc. Thus, processing associated with the VIM control plane is fenced to CPU Core 0 of Socket 0 and Socket 1, whereas all the other CPU cores (Cores 1+) are intended for use for workload VNF(s).

To optimize the performance of VIM, resources such as CPU cores are dedicated (for cloud management) by the following logic: avoid the default CPU core(s) dedicated for serving interrupts, while selecting a number of cores and specific cores, per socket based on design and telco workload requirements.

In one embodiment, this CPU fencing can help reduce the overhead to 0%, since at least one of the CPU cores per socket is used to receive interrupts and cannot be used for guest workloads. This means that the remote compute entity components can have guaranteed performance, and similarly are guaranteed not to affect guest VMs operations. Because of the lack of overhead, 1+1, 2+1 or other control plane redundancy methods can be used, if desired. This ensures consistent NFVI service level agreement (SLA) performance.

Fencing for Guest Workloads/VNFs Improvements

Figure 5:
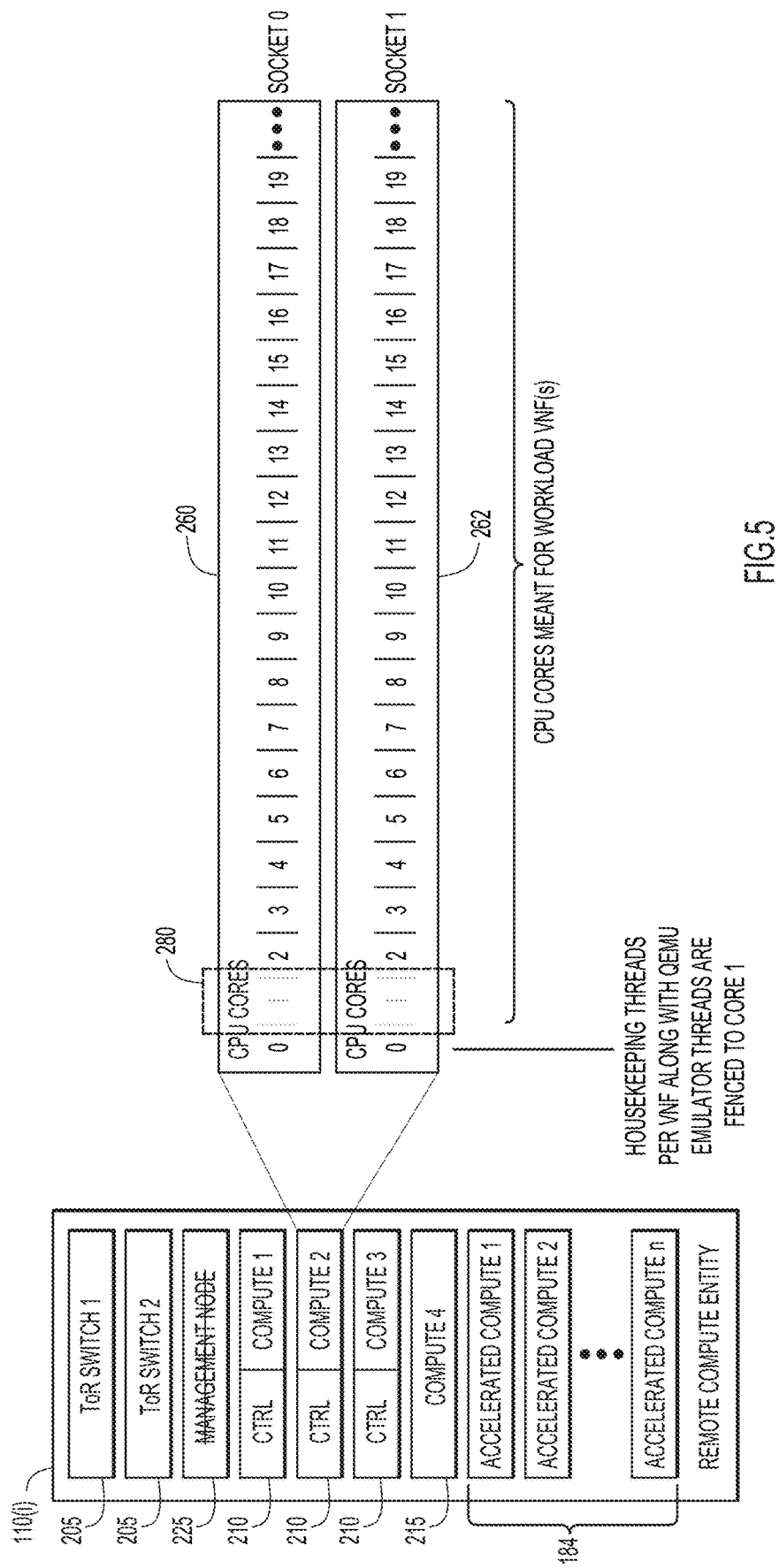

Reference is now made to FIG. 5. In accordance with still another embodiment, specific CPU core(s) per CPU socket are fenced to ensure performance for guest VMs such as vRAN etc., related workload/applications VNFs, but in a manner so as to minimize the number of CPU Core(s) used by each VNF for housekeeping (e.g. non-real-time tasks) purposes. For example, as shown at 280, housekeeping threads per VNF are fenced to Core 1 of Socket 0 and Socket 1. The logic employed is that the application VNFs can share the CPU core(s) on a particular socket with other VNFs' to run non-real-time tasks. This logic is followed whether or not hyper-threading is enabled. Additionally, the QEMU emulator (QEMU is a generic and open source machine emulator and virtualizer) tasks can also be placed on these "shared" CPU core(s) and yet guarantee that they do not cross non-uniform memory access (NUMA) boundaries. This is done by formulating VNF resource requirements for vCPU with granularity in decimal value rather than whole number. NUMA is a computer memory design used in multiprocessing, where the memory access time depends on the memory location relative to the processor. With NUMA, a processor can access its own local memory faster than non-local memory (memory local to another processor or memory shared between processors).

To minimize thread interrupts and enable faster scheduling, a real-time kernel may be used on the nodes. Also, specific Basic Input/Output System (BIOS) settings may be used to assist in low latency. These VIM enhancements (around node resources such as CPU, memory etc.) ensures maximum utilization of NFVI resources for telco cloud workloads, useful for resource constrained edge PODs.

A real-time Linux kernel can promote reduced latency via prioritization and pre-emption, so as to achieve more predictability of the time taken between a request for a task to be performed and the actual task being executed by the CPU core. However, Linux is not a hard real-time system and will interrupt workloads. Linux also takes the opportunity to run work when it becomes active, for instance, in context switches or VMexits and other changes of control, and processes hardware interrupts, all of which interrupt and steal time from VM workloads. The consequence is that the CPU core may be consumed for either housekeeping characteristics of the Linux OS or OpenStack control purposes or actual VNF application tasks or network I/O etc., making it somewhat difficult to predict interrupt scenarios and yielding a non-deterministic impact to the overall viability and performance of the system.

A solution is to set up VMs to enable workloads on individual cores, provided they remain within certain constraints, to harness the entire power of the CPU. Additionally, some cores may be dedicated in this way while, for efficiency, other cores may be shared across multiple tasks. This means that if workloads avoid operations that cause VMexits or local interrupts such as timer interrupts (which is within their control), they will receive 100% of the CPU with no interruptions. All interrupts are diverted by making sure that no other process is runnable on the specific CPU cores, and there is no reason for a host system call to occur on them.

Even in a symmetric multiprocessing (i.e. multi-core) system with pre-emptive multitasking, limiting cores to be able to run only one task provides hard real-time behavior. In order to do this, cores are set aside on the system to run these displaced management tasks, and cores are set aside for other system real-time tasks, such as network forwarding. Again, this involves 'fencing' CPUs to specific purposes (as depicted in FIGS. 4 and 5), where the task runs only on that CPU and also that CPU only runs that task.

Networking between remote compute entities and the central management entity may use IPv6-only as transport to avoid any NAT usage on the WAN/MAN 120 (FIG. 1). Also, IP subnets are carefully selected and mapped to ports for added network security. This networking choice enable simplicity and better performance. Also, a REST API over TLS is used to remotely manage the remote compute entities.

Figure 6:
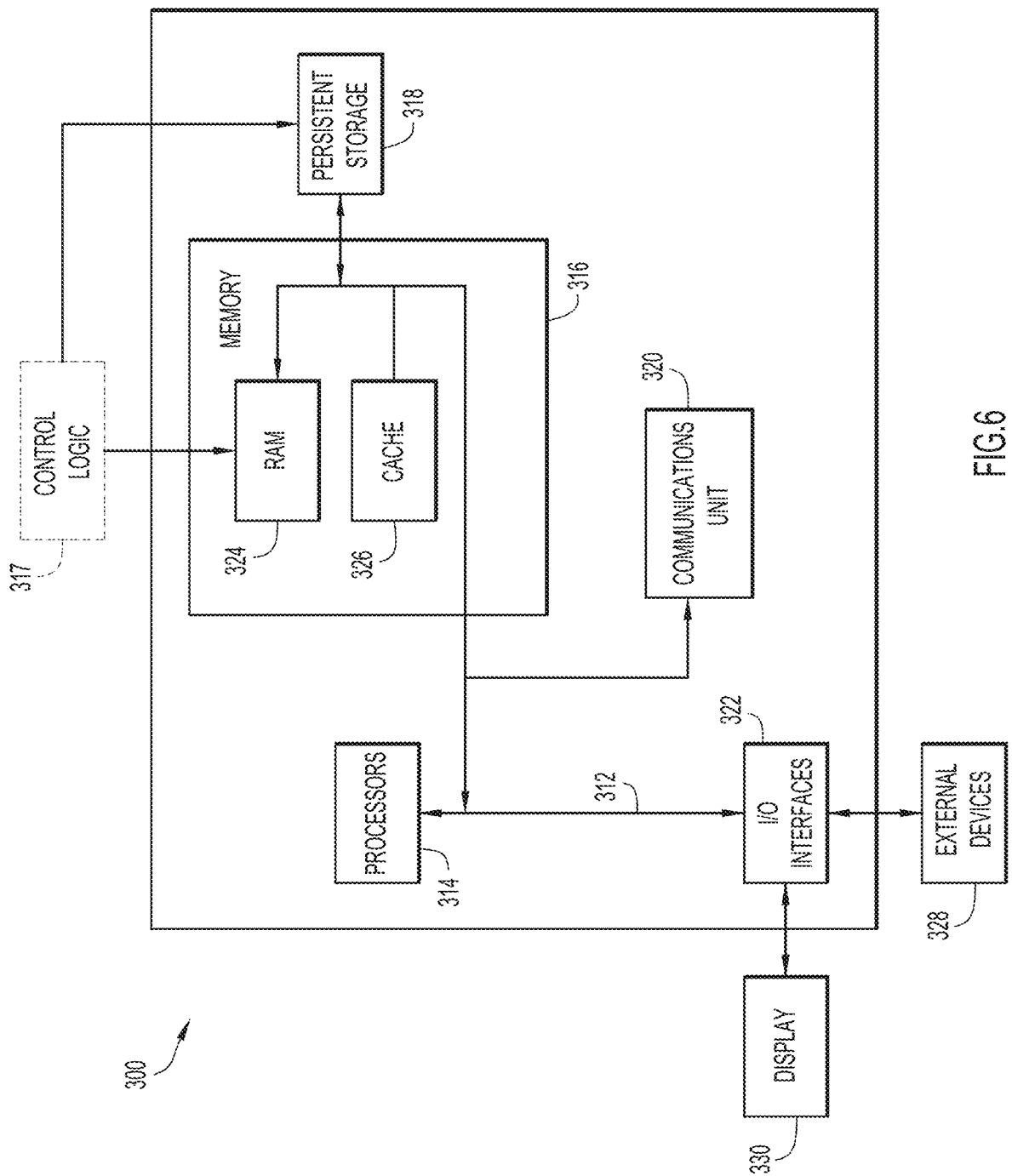
FIG. 6 is a block diagram of a computing apparatus that may be configured according to the embodiments presented herein.

FIG. 6 illustrates a hardware block diagram of a computing device 600 that may perform the functions of any of the servers or computing or control entities referred to herein in connection with FIGS. 1-5, including the management entity 105 and the edge compute entities 110(1)-110(N). It should be appreciated that FIG. 6 provides only an illustration of one embodiment and does not imply any limitations with regard to the environments in which different embodiments may be implemented. Many modifications to the depicted environment may be made.

As depicted, the device 300 includes a bus 312, which provides communications between computer processor(s) 314, memory 316, persistent storage 318, communications unit 320, and input/output (I/O) interface(s) 322. Bus 312 can be implemented with any architecture designed for passing data and/or control information between processors (such as microprocessors, communications and network processors, etc.), system memory, peripheral devices, and any other hardware components within a system. For example, bus 312 can be implemented with one or more buses.

Memory 316 and persistent storage 318 are computer readable storage media. In the depicted embodiment, memory 316 includes random access memory (RAM) 324 and cache memory 326. In general, memory 316 can include any suitable volatile or non-volatile computer readable storage media. Instructions for Control Logic 317 may be stored in memory 316 or persistent storage 318 for execution by processor(s) 314.

One or more programs may be stored in persistent storage 318 for execution by one or more of the respective computer processors 314 via one or more memories of memory 316. The persistent storage 318 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 318 may also be removable. For example, a removable hard drive may be used for persistent storage 318. Other examples include optical and magnetic disks, thumb drives, and smart cards that are inserted into a drive for transfer onto another computer readable storage medium that is also part of persistent storage 318.

Communications unit 320, in these examples, provides for communications with other data processing systems or devices. In these examples, communications unit 320 includes one or more network interface cards. Communications unit 320 may provide communications through the use of either or both physical and wireless communications links.

I/O interface(s) 322 allows for input and output of data with other devices that may be connected to computer device 300. For example, I/O interface 322 may provide a connection to external devices 328 such as a keyboard, keypad, a touch screen, and/or some other suitable input device. External devices 328 can also include portable computer readable storage media such as database systems, thumb drives, portable optical or magnetic disks, and memory cards.

Software and data used to practice embodiments can be stored on such portable computer readable storage media and can be loaded onto persistent storage 318 via I/O interface(s) 322. I/O interface(s) 322 may also connect to a display 330. Display 330 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

There are numerous advantages achieved by the embodiments presented herein. First, a distributed NFVI deployment is enabled with 100% of nodes used for hosting service workloads. Second, scalability is provided by using a centralized management infrastructure that can manage thousands of remote edge PODs. Third, this architecture avoids having to store multi0ple-gigabytes of software images, and hence removing the need for large amounts of storage space in constrained edge locations. Minimizes persistent storage at the edge reduces failure modes. Managing the image service centrally and securely, helps reduce operation cost. Fourth, NFVI system viability (functionality and availability) is improved, as well as the performance (more VNFs per node, for example), due to CPU fencing. Use of IPv6 helps reduce concerns of address space management. Finally, tremendous cost savings is achieved due to not using additional hosts in PODs in remote locations for POD deployment/management. Also, using a REST API over TLS helps manage the clouds remotely from a central network operations facility.

In summary, a system is provided that includes one management cluster to manage NFVI resources' lifecycle in more than one remote POD locations, where resources include hardware and/or software, and where software resources lifecycle includes software development, upgrades, downgrades, logging, monitoring etc.

In addition, methods are provided for decoupling storage from compute and network functions in each VM based NFVI deployment location and moving it to a centralized location. Centralized storage could simultaneously interact with more than one remote PODs, and where the security is built-in with periodic key rotation, and where some of the storage functions, such as a VM software image hosting, could be provided by the router file system in the IP network.

Further still, methods are provided for increasing NFVI system viability by dedicating (fencing) CPU core pairs for specific controller operations and workload operations, and sharing the CPU cores for specific tasks.

In summary, a system is provided including a plurality of edge compute entities configured to process low-latency workloads, each edge compute entity including multiple compute nodes that run virtual machines to perform radio access network compute and control functions, but not data storage functions, each edge compute entity further configured to execute a virtualization monitoring agent function; and a management entity in network communication with the plurality of edge compute nodes, the management entity including data storage resources to provide data storage for the plurality of edge compute entities and compute resources for management of the plurality of edge compute entities, the management entity further configured to execute a virtualization monitoring service function that is in communication with the virtualization monitoring agent function running on each of the plurality of edge compute entities to manage network function virtualization infrastructure (NFVI) lifecycle sources of the plurality of edge compute entities.

In one form, the data storage resources of the management entity may include a plurality of storage nodes and a storage management node configured to simultaneously interact with more than one of the plurality of edge compute entities to perform data storage functions for the edge compute entities.

Each of the plurality of edge compute entities may have 0-hop or 1-hop network connectivity to one or more wireless base stations that serve wireless communication with one or more wireless user equipment. The one or more wireless base stations may include wireless base stations configured to server wireless communication according to multiple wireless technologies.

The virtual machines running at each of the plurality of edge compute entities host virtual network function operations associated with establishing and maintaining sessions between a wireless base station and one or more wireless user equipment. In one form, at least one compute node of the plurality of edge compute entities comprises a plurality of central processing unit (CPU) cores, and wherein a particular CPU core of the plurality of CPU cores for a given CPU socket or a given pair of corresponding CPU cores of the plurality of CPU cores for respective CPU sockets is fenced so that only the given CPU cores or the given pair of corresponding CPU cores is used to perform virtualization infrastructure management control plane functions, and remaining CPU cores of the plurality of CPU cores are dedicated for executing the virtual network function operations. In another form, at least one compute node of the plurality of edge compute entities comprises a plurality of central processing unit (CPU) cores, and wherein a particular CPU core of the plurality of CPU cores for a given CPU socket or a given pair of corresponding CPU cores of the plurality of CPU cores for respective CPU sockets is fenced so that only the given CPU cores or the given pair of corresponding CPU cores is used for non-real-time tasks of the virtual network function operations.

The system may further include a plurality of network element storage disks in a wide area network that enables the network communication between the management entity and the plurality of edge compute entities, wherein one or more of the network element storage disks are configured to store software images of the virtual machines running on the plurality of edge compute entities.

The data storage resources of the management entity may include a plurality of storage nodes and a storage management node configured to simultaneously interact with more than one of the plurality of edge compute entities to perform data storage functions for the edge compute entities.

The system may further include a cluster of object-based storage system control nodes for controlling access to data objects stored in the data storage resources on behalf of the plurality of edge compute entities. The cluster of object-based storage system control nodes may be configured to generate an intent file for each of the plurality of edge compute entities, the intent file defining node names and rules for a corresponding one of the plurality of edge compute entities, the intent file further including a cluster identifier and image keys so that after installation of the intent file by a given edge compute entity, the given edge compute entity can communicate with a monitor function of the cluster of object-based storage system control nodes for image services that include discovering, registering and retrieving virtual machine images.

The management entity may comprise at least one of: a centralized management entity including one or more servers and storage disks, a physically distributed set of servers and storage disks co-operatively providing management of the edge compute entities for failover and load distribution, or a plurality of independent entities, each of which is assigned by region to manage a corresponding plurality of edge compute entities.

In still another form, an apparatus is provided comprising: a communication interface configured to enable communication with a plurality of edge compute entities configured to process low-latency workloads, each edge compute entity including multiple compute nodes that run virtual machines to perform radio access network compute and control functions, but not data storage functions, each compute entity further configured to execute a virtualization monitoring agent function; data storage resources configured to provide centralized data storage for the plurality of edge compute entities; and compute resources configured to provide centralized management of the plurality of edge compute entities, wherein the compute resources includes at least one processor that is configured to execute a virtualization monitoring service function that is in communication with the virtualization monitoring agent function running on each of the plurality of edge compute entities to manage network function virtualization infrastructure (NFVI) lifecycle sources of the plurality of edge compute entities.

The data storage resources may include a plurality of storage nodes and a storage management node configured to simultaneously interact with more than one of the plurality of edge compute entities to perform data storage functions for the edge compute entities.

The apparatus may further include a cluster of object-based storage system control nodes for controlling access to data objects stored in the data storage resources on behalf of the plurality of edge compute entities. The cluster of object-based storage system control nodes are configured to generate an intent file for each of the plurality of edge compute entities, the intent file defining node names and rules for a corresponding one of the plurality of edge compute entities, the intent file further including a cluster identifier and image keys so that after installation of the intent file by a given edge compute entity, the given edge compute entity can communicate with a monitor function of the cluster of object-based storage system control nodes for image services that include discovering, registering and retrieving virtual machine images.

In another form, an apparatus is provided comprising at least one switch configured to enable connectivity with one or more base stations that serve wireless communication with one or more wireless user equipment; and a plurality of compute nodes configured to run virtual machines to perform radio access network compute and control functions in connection with the wireless communication served for the wireless user equipment, but not data storage functions, wherein the virtual machines host virtual network function operations associated with establishing and maintaining sessions between the one or more base stations and the one or more wireless user equipment.

The at least one switch may be configured to provide 0-hop or 1-hop network connectivity to the one or more base stations, and wherein the one or more base stations base stations configured to serve wireless communication according to multiple wireless technologies.

In one form, at least one compute node may comprise a plurality of central processing unit (CPU) cores, and wherein a particular CPU core of the plurality of CPU cores for a given CPU socket or a given pair of corresponding CPU cores of the plurality of CPU cores for respective CPU sockets is fenced so that only the given CPU cores or the given pair of corresponding CPU cores is used to perform virtualization infrastructure management control plane functions, and remaining CPU cores of the plurality of CPU cores are dedicated for executing virtual network function operations. In another form, at least one compute node comprises a plurality of central processing unit (CPU) cores, and wherein a particular CPU core of the plurality of CPU cores for a given CPU socket or a given pair of corresponding CPU cores of the plurality of CPU cores for respective CPU sockets is fenced so that only the given CPU cores or the given pair of corresponding CPU cores is used for non-real-time tasks of virtual network function operations.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a communication interface configured to enable network communication with a plurality of edge compute entities configured to process virtual service workloads, each edge compute entity including multiple compute nodes that run virtual service workloads to perform radio access network compute and control functions, each edge compute entity further configured to execute a virtualization monitoring agent function;

data storage resources comprising one or more persistent storages and configured to provide centralized, persistent data storage for the plurality of edge compute entities; and compute resources configured to provide centralized management of the plurality of edge compute entities, wherein the compute resources includes at least one processor that is configured to execute a virtualization monitoring service function that is in communication with the virtualization monitoring agent function running on each of the plurality of edge compute entities to manage network function virtualization infrastructure (NFVI) lifecycle of resources of the plurality of edge compute entities.

2. The apparatus of claim 1, wherein the data storage resources provide object storage for the virtual service workloads.

3. The apparatus of claim 1, wherein each edge compute entity is a multi-access edge compute (MEC) node.

4. The apparatus of claim 1, wherein the data storage resources comprise an OpenStack message bus queue.

5. The apparatus of claim 1, wherein the persistent data storage for the plurality of edge compute entities comprises one or more software images associated with the virtual service workloads.

6. The apparatus of claim 1, wherein the data storage resources include a plurality of storage nodes and a storage management node configured to simultaneously interact with more than one of the plurality of edge compute entities to perform data storage functions for the edge compute entities.

7. The apparatus of claim 1, wherein each of the plurality of edge compute entities has 0-hop or 1-hop network connectivity to one or more wireless base stations that serve wireless communication with one or more wireless user equipment.

8. The apparatus of claim 1, wherein at least one of the virtual service workloads execute operations associated with establishing and maintaining sessions between a wireless base station and one or more wireless user equipment.

9. The apparatus of claim 1, further comprising a cluster of object-based storage system control nodes for controlling access to data objects stored in the data storage resources on behalf of the plurality of edge compute entities.

10. The apparatus of claim 1, wherein the data storage resources comprise a plurality of network element storage disks in a wide area network that enables the network communication between the data storage resources and the plurality of edge compute entities, wherein one or more of the network element storage disks are configured to store software images of the virtual service workloads running on the plurality of edge compute entities.

11. A system comprising:

a plurality of edge compute entities configured to process virtual service workloads, each edge compute entity including multiple compute nodes that run virtual service workloads to perform radio access network compute and control functions, each edge compute entity further configured to execute a virtualization monitoring agent function;

a management entity in network communication with the plurality of edge compute entities, the management entity including data storage resources comprising one or more persistent storages and configured to provide centralized, persistent data storage for the plurality of edge compute entities; and compute resources configured to provide centralized management of the plurality of edge compute entities, wherein the compute resources includes at least one processor that is configured to execute a virtualization monitoring service function that is in communication with the virtualization monitoring agent function running on each of the plurality of edge compute entities to manage network function virtualization infrastructure (NFVI) lifecycle of resources of the plurality of edge compute entities.

12. The system of claim 11, wherein the data storage resources provide object storage for the virtual service workloads.

13. The system of claim 11, wherein each edge compute entity is a multi-access edge compute (MEC) node.

14. The system of claim 11, wherein the data storage resources comprise an OpenStack message bus queue.

15. The system of claim 11, wherein the persistent data storage for the plurality of edge compute entities comprises one or more software images associated with the virtual service workloads.

16. The system of claim 11, wherein the data storage resources include a plurality of storage nodes and a storage management node configured to simultaneously interact with more than one of the plurality of edge compute entities to perform data storage functions for the edge compute entities.

17. The system of claim 11, wherein each of the plurality of edge compute entities has 0-hop or 1-hop network connectivity to one or more wireless base stations that serve wireless communication with one or more wireless user equipment.

18. The system of claim 11, wherein at least one of the virtual service workloads execute operations associated with establishing and maintaining sessions between a wireless base station and one or more wireless user equipment.

19. The system of claim 11, further comprising a cluster of object-based storage system control nodes for controlling access to data objects stored in the data storage resources on behalf of the plurality of edge compute entities.

20. The system of claim 11, wherein the data storage resources comprise a plurality of network element storage disks in a wide area network that enables the network communication between the management entity and the plurality of edge compute entities, wherein one or more of the network element storage disks are configured to store software images of the virtual service workloads running on the plurality of edge compute entities.

* * * * *